Sept. 25, 1923.
H. D. CHURCH
HYDROCARBON MOTOR
Filed Oct. 1, 1919     4 Sheets-Sheet 2
1,469,149
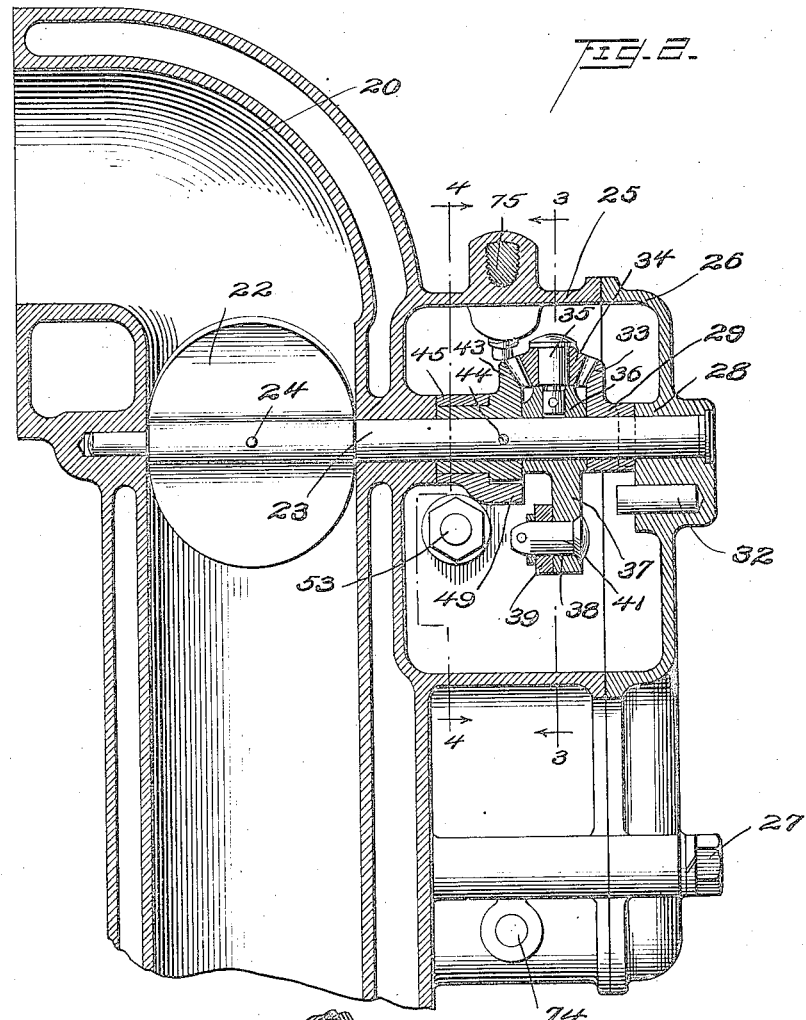
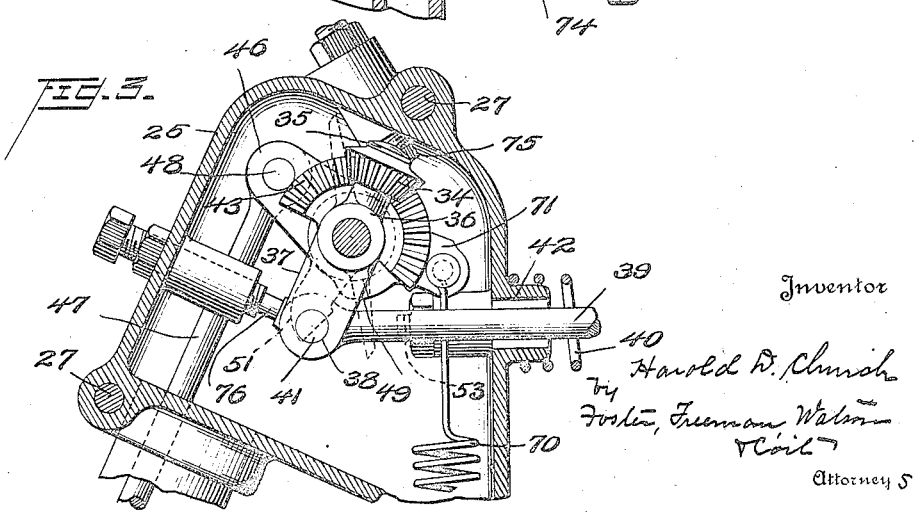

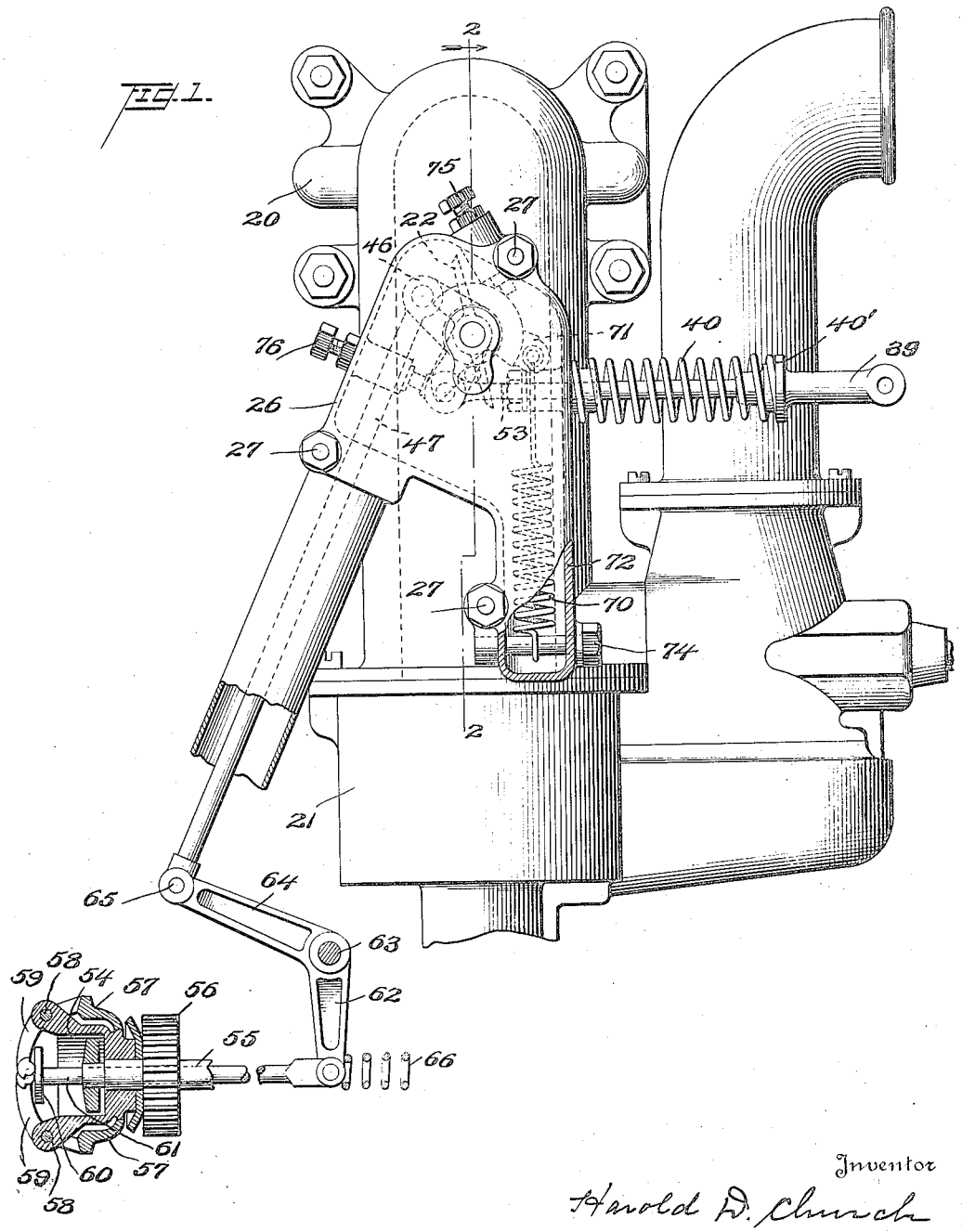

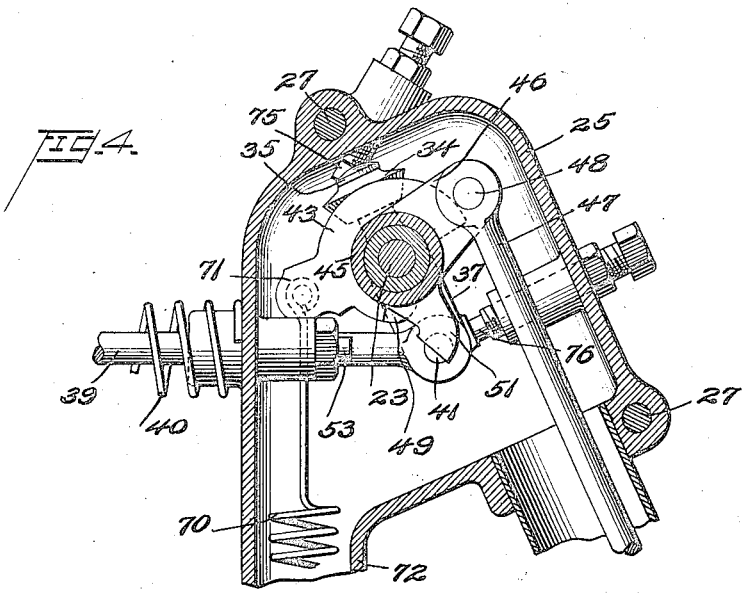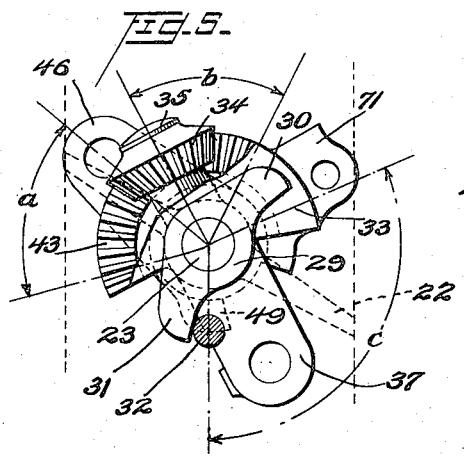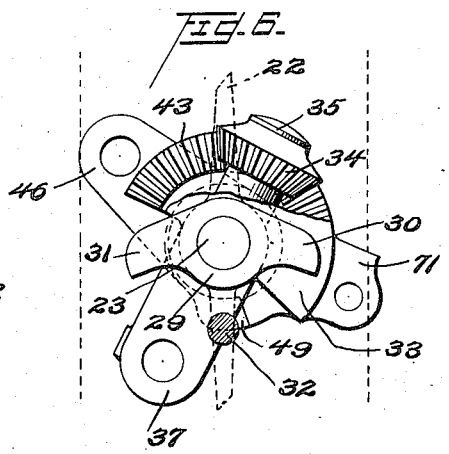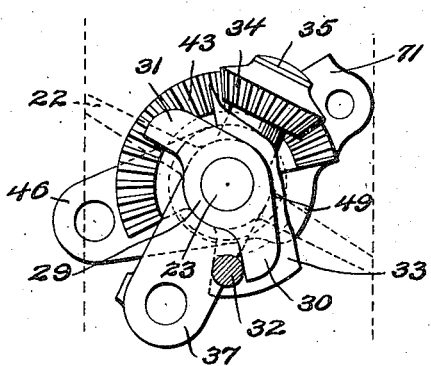

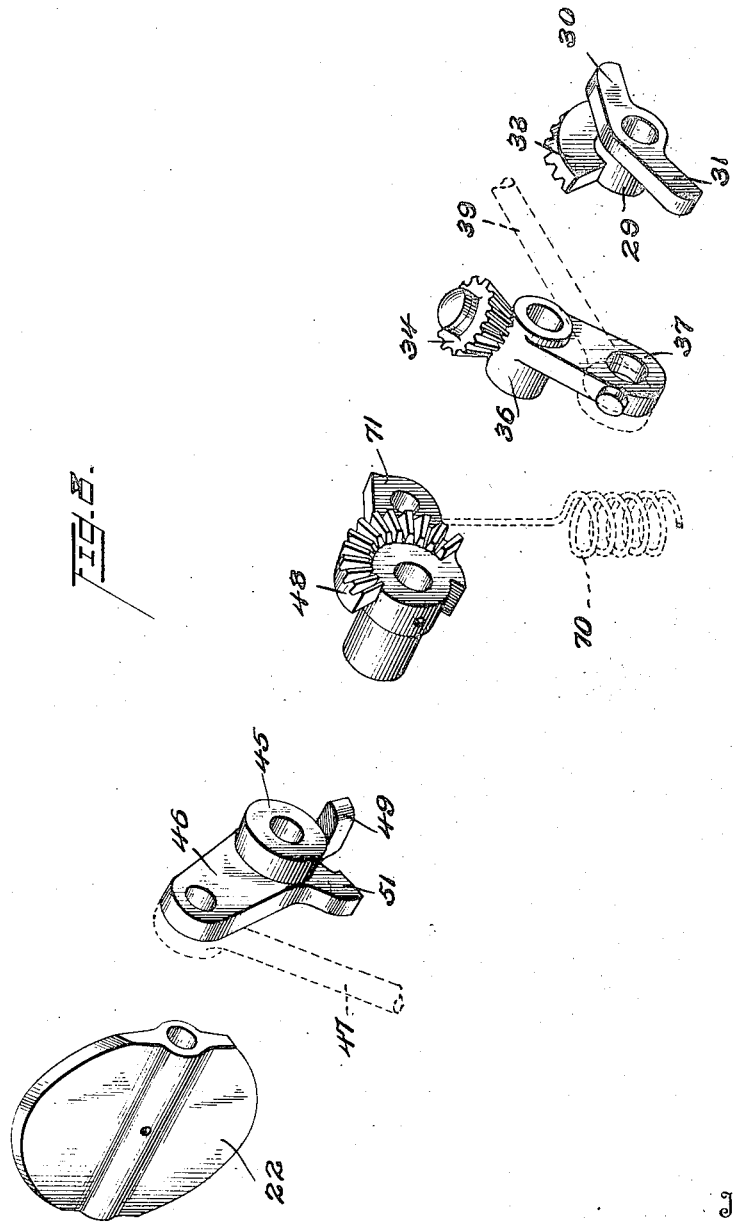

Patented Sept. 25, 1923.

1,469,149

UNITED STATES PATENT OFFICE.

HAROLD D. CHURCH, OF DETROIT, MICHIGAN, ASSIGNOR TO PACKARD MOTOR CAR COMPANY, OF DETROIT, MICHIGAN, A CORPORATION OF MICHIGAN.

HYDROCARBON MOTOR.

Application filed October 1, 1919. Serial No. 327,703.

*To all whom it may concern:*

Be it known that I, HAROLD D. CHURCH, a citizen of the United States, and residing at Detroit, Wayne County, State of Michigan, have invented certain new and useful Improvements in Hydrocarbon Motors, of which the following is a specification.

The present invention relates to hydrocarbon motors and more particularly to mechanism for controlling the speed thereof.

In certain types of motor vehicles, such as trucks, it is desirable to provide means to automatically limit their speed. Heretofore, one of the arrangements for accomplishing this result included a second throttle disposed in the intake between the usual manually controlled throttle valve and the cylinders, this second valve being controlled by a governor responsive to the speed of the motor. The construction was such, that, as the motor speed increased the second valve was moved in its closing direction thereby decreasing the supply of combustible mixture to the cylinders, in consequence of which, the motor slowed down. Thus, the mechanism limited the maximum speed which the motor might attain.

It is the principal object of the present invention to simplify and improve the construction for obtaining the results mentioned above. To this end, the second throttle valve is omitted and a novel mechanism is provided for controlling and actuating the usual throttle valve. One embodiment of the invention and the novel features thereof will be apparent from the description taken in connection with the drawings, in which:

Figure 1 is a side elevation of a hydrocarbon motor intake and carburetor illustrating the present invention in connection therewith, the governor for controlling the throttle valve being shown in section;

Figure 2 is an enlarged sectional elevation taken substantially on the line 2—2 of Figure 1 looking in the direction indicated by the arrows;

Figure 3 is a sectional elevation taken substantially on the line 3—3 of Figure 2 looking in the direction indicated by the arrows;

Figure 4 is a sectional elevation taken substantially on the line 4—4 of Figure 2 looking in the direction indicated by the arrows;

Figures 5 to 7 inclusive are more or less diagrammatic views illustrating various positions of the parts of the mechanism mounted on the valve spindle, and Figure 8 is an exploded or disassembled view of the gearing mounted on the valve spindle.

Referring to the drawings, 20 indicates the inlet conduit of a hydrocarbon motor carrying a carburetor 21 at its lower end. For the purpose of controlling the flow of combustible mixture to the motor a throttle valve 22 is disposed in the said inlet, being secured to a valve spindle 23 by any suitable means such as a pin 24. The spindle extends laterally on one side of the inlet conduit and has mechanism mounted thereon for controlling and operating the valve. As shown this mechanism is mounted within a housing which consists of two parts, one part 25 being formed integral with the intake and the other part 26 being secured thereto, as by means of the bolts 27. The outer end of the spindle has a bearing in the bore 28 formed in the outer wall of the part 26 of the housing. Mounted on the spindle to turn freely relative thereto is a hub 29, one end of which bears against the end wall of the part 26, and has a pair of radially extending stop arms 30 and 31, the surfaces of said arms facing each other being radial and flat and subtending an angle *c* (Fig. 5). Secured in the end wall of the part 26 and projecting into the space between the arms 30 and 31 is a pin 32 arranged with its axis parallel to the axis of the spindle. This pin in conjunction with the arms provides a stop for limiting the extent of angular movement of the hub 29 on the spindle. At its opposite end the hub is provided with a segmental bevel gear 33 which meshes with a planet gear 34 rotatably carried by a pin 35 secured to the hub 36 mounted on the spindle for free turning movement relative thereto. Opposite to pin 35, the hub 36 is provided with a radially extending arm 37, which is formed at its outer end with an aperture 38. A manually operable rod 39 has an end connected to the arm 37 by a pin 41 disposed in the aperture 38. The rod 39 extends into the housing through a slot 42 (see Fig. 3) in the wall thereof and is designed to be operated from the steering wheel of the vehicle in the usual manner for opening and closing the throttle valve. A spring 40 interposed between the casing and a collar 40' on the rod tends to move the rod 39 in the direction to close the valve. Meshing with the opposite side of the planet gear 34 with respect to the gear 33 is a segmental bevel gear 43 which is secured to the spindle 23 in any suitable manner as by means of the pin 44. A portion of the hub of the gear 43 is reduced and rotatably mounted on the same between the gear 43 and the inlet conduit is a hub or sleeve 45 which has a radially extending arm 46, the outer end of which is pivotally connected to a rod 47 by the pin 48. Extending laterally from one side of the hub 45 is a lug 49 which is disposed in the path of an edge of the gear 43. Thus as the arm 46 is moved in the direction which would close the throttle valve, the lug or stop 49 will engage the gear 43, thus turning the spindle and throttle valve in its closing direction. On the other hand, the arm 46 may be moved in the opposite direction without communicating its rotation to the throttle valve. It is desirable that the throttle valve when moved by the arm 46 be restrained from entirely closing, so that sufficient opening will be provided to supply mixture to keep the engine running slowly when idling. For this purpose the hub 45 is provided with an arm 51 adapted to strike against an adjustable stop 53 carried by the casing member 25. Thus movement transmitted to the throttle valve from the rod 47 can never fully close the same.

To aid in the proper functioning of the gearing, a spring 70 pulls on the arm 71 of gear 43, this spring being disposed in a tubular housing 72 integral with member 25 of the casing. The lower end of the spring is secured to a stud 74 passing through the housing. To limit the motion of the gear 43 in the direction opposed by spring 70, an adjustable stop 75 is provided. As shown this stop is a bolt threaded through the casing. An adjustable stop 76 is also provided to limit the opening movement of arm 37.

In the embodiment herein disclosed a governor is provided for the purpose of automatically limiting the opening of the throttle valve or moving it in a closing direction as the speed of the motor increases. As shown this governor comprises a cup shaped member 54 secured to sleeve 55 which also carries for rotation therewith a gear 56. This latter gear is driven by the motor and therefore through the sleeve causes the member 54 to rotate therewith. A pair of governor weights 57 are pivotally mounted on the member 54 as at 58 and have the arms 59 disposed to act against the disk 60 on the end of rod 61 extending through the sleeve 55. The opposite end of this rod 61 is connected to the arm 62 of a bent lever 63, the other arm 64 of said lever being pivotally joined to the rod 47 as at 65. In the operation of the governor as the speed of rotation increases, the weights 57 fly outward thereby pressing the disk and rod 61 toward the right as viewed in Figure 1. This motion of the rod may be resisted in any yielding manner, as by means of a spring 66 acting against the outer end of the arm 62. This motion is communicated through the lever 63 to rod 47 and through the connections previously described causing the throttle valve to be turned in the closing direction. If the speed of the motor decreases, then the spring 66 causes the weights 57 to be forced radially inward and also moves the arm 46 on the spindle 23 in the direction which permits the throttle valve to be opened, if the operator so chooses. Although a specific form of governor has been described, it is to be understood that the invention is not limited to any particular type of governor, nor to any particular position of the same relative to the mechanism mounted on the spindle of the throttle valve.

The operation of the mechanism will now be described reference being had particularly to Figures 5 to 8 inclusive. The normal positions of the parts on the valve spindle are illustrated in Figure 5. Thus the valve 22 is closed, the manually operated arm 37 is also in the position corresponding with the closed throttle and the governor arm 46 is in the position corresponding to an open throttle valve. The construction of the various parts is such that the governor arm 46 in order to close the throttle valve moves through the angle $a$ indicated in Figure 5 and the manually controlled arm 37 with the planet gear moves through the angle $b$, these angles being equal. It will be observed further that the angular movement of the hub 29 permitted by the pin 32 is twice the angles $a$ or $b$, being indicated at $c$. Now assuming that the operator desires to speed up the motor, he will actuate the rod 39 to throw the arm 37 and the planet gear from the position shown in Figure 5 to that shown in Figure 6. This movement will be communicated to the bevel segments 43 and 33 so that they will be turned to the positions shown in Figure 6. As the throttle valve 22 is connected with the bevel gear 43, it will therefore be moved to its open position. At the same time the arms 30 and 31 being integrally connected with the bevel gear 33 will be moved to the position shown in this latter figure. In these figures it is to be understood that the bevel gear 33 is not illustrated, as its particular position is unimportant. The hub 29 and arms 30 and 31, however, are shown, and as gear 33 is integral therewith, its rotation will be the same as said parts.

As stated the last operation was to open up the throttle valve so as to speed up the motor. It will be assumed now that the motor has reached such a speed that the governor becomes operative for the purpose of closing the valve and decreasing the speed of the motor. The increased speed of rotation of the governor will cause the weights 57 to fly out and through the connections previously described turn the arm 46 in a counterclockwise direction as viewed in Figure 6, perhaps to the position shown in Figure 7. The extent of this turning of the arm 46 of course will depend upon the speed of the motor. If the speed decreases to such an extent that the weights 57 move inward, then of course the arm 46 would not move to the extreme position shown in Figure 7. This motion of arm 46 through the lug 49 turns gear 43 and thereby the throttle valve in a closing direction. The rotation of the gear 43 of course tends to turn the planet gear 34, and in turn the gear 33, bringing arm 30 against stop pin 32 thus limiting further rotation of gear 33.

Assuming that the above operation retards the speed of the motor the governor arm will then be moved to the position shown in Figure 5 by the spring 66. This clockwise rotation of the governor arm 46 of course is not communicated to the throttle valve for the reason that the lug 49 is moved away from its cooperating surface on gear 43. The position of this governor arm however, it will be seen, limits the extent of opening movement of the throttle valve.

Although the valve has been described as being moved to wide open or closed positions, it is to be understood that the extent of movement due to the manual control may be as desired, except that the valve may not be opened wider than the governor controlled means permits. Likewise its movement of arm 46 may be less than its entire travel. In any event, the relative action of the parts will be as described above.

Although the invention has been shown as using differential gearing on the valve spindle, it is to be understood that other forms of epicyclic gear trains might be used. Furthermore, the invention comprehends other changes and modifications which come within the scope of the appended claims.

Having thus described my invention what I claim as new and desire to secure by Letters Patent is:

1. The combination with a hydrocarbon motor having a throttle valve, of automatic means connected to move said valve in its closing direction only, when the motor exceeds a predetermined speed, and means to operate the valve manually within a limit set by said automatic means and permit said automatic means to close the valve without disturbing the manually operable means, comprising epicyclic gearing consisting of at least three elements, means to manually operate the planetary element of said gearing, another of said elements being connected to the valve and means to limit the extent of rotation of the third element.

2. The combination with a hydrocarbon motor having a throttle valve, of automatic means connected to move said valve in its closing direction only, when the motor exceeds a predetermined speed, and means to operate said valve manually within a limit set by said automatic means and also permit said automatic means to close the valve without disturbing the setting of the manually operable means, comprising epicyclic gearing consisting of two coaxial gears and a planet gear operatively connected to said two gears, means to limit the rotation of one of said gears, a manually operable device secured to another of said gears and means connecting the third gear with the valve.

3. The combination with a hydrocarbon motor having a throttle valve, of automatic means to move said valve in its closing direction only, when the motor exceeds a predetermined speed, and means to operate said valve manually within a limit set by said automatic means and also permit said automatic means to close the valve without disturbing the manually operable means, comprising a rotatably mounted member, means to limit the angular movement of said member, a second rotatable member connected to said valve, a third rotatable member operatively connected to said other members, and means connected to said third member to manually operate the same.

4. The combination with a hydrocarbon motor having a rotatable valve; of means to operate and control said valve including epicyclic gearing arranged coaxially with said valve, manually operable means connected to the planet member of said gearing to open and close the valve, and automatic means to limit the opening of the valve inversely to the speed of the motor.

5. The combination with a hydrocarbon motor having a rotatable valve; of means to operate and control said valve including epicyclic gearing arranged coaxially with said valve, means to limit the extent of movement of one of the members of the gearing, manually operable means connected to the planet member of said gearing to open and close the valve and automatic means to move said valve in the closing direction as the speed of the motor increases.

6. The combination with a hydrocarbon motor having a rotatable valve; of means to operate and control said valve including a rotatable member arranged coaxially with said valve, means to limit the rotation of said member, a second rotatable member connected to and coaxial with said valve, a third member rotatably connected to the other members, manually operable means to actuate said third member, and automatic means to move said valve in the closing direction as the speed of the motor increases.

7. In combination with a hydrocarbon motor having a throttle valve; of means to actuate and control said valve including differential epicyclic gearing, means to limit the extent of movement of one of the members of said gearing, manually operable means connected to the planet gear of said gearing to open and close said valve, and means to limit the opening of the valve inversely to the speed of the motor.

8. The combination with a hydrocarbon motor having a throttle valve and spindle, epicyclic gearing mounted on said spindle including a gear secured thereto, a gear arranged for limited rotation with respect to said spindle, a support rotatably mounted on said spindle, a planet gear carried by said support and operatively connected to said other gears, manually operable means connected to turn said support, and speed responsive means to control the opening of the valve inversely to the speed of the motor.

9. The combination with a hydrocarbon motor having an intake, of a throttle valve in said intake having a spindle, differential gearing mounted on said spindle, a housing secured to the intake and surrounding said gearing, manually operable means connected to one element of said gearing, means to limit the opening of the valve and a governor driven by the motor connected to said means to control the same.

10. The combination with a hydrocarbon motor, of a throttle valve having a spindle; differential gearing mounted on said spindle including a gear secured thereto, a coaxial gear free to turn relative to the spindle, means to limit the angle through which the latter gear may turn, and a planet gear associated with the other gears; manually operable means connected to the planet gear, a speed governor driven by the motor, an arm mounted on the spindle having a stop, means connecting the governor and arm, and a lug on the first mentioned gear in the path of said stop, whereby the valve is moved in the closing direction when the speed of the motor increases.

11. The combination with a hydrocarbon motor having a throttle valve, a gear mounted for limited rotation, a second gear connected to turn with the valve spindle, a rotatably mounted arm, a planet gear carried by said arm and associated with the other gears, manually actuated means connected to said arm, spring means tending to close said valve, a stop to limit the opening of said valve, and speed responsive means to control the position of said stop.

In testimony whereof I affix my signature.

HAROLD D. CHURCH.